United States Patent Office 3,843,518
Patented Oct. 22, 1974

3,843,518
COMMERCIAL CHROMATOGRAPHY FOR MORE THAN TWO COMPONENTS

Ellington M. Magee, Elizabeth, and Frank J. Healy, Morristown, N.J., assignors to Esso Research and Engineering Company
Filed Aug. 23, 1972, Ser. No. 282,983
Int. Cl. B01d
U.S. Cl. 210—31 C                                 11 Claims

ABSTRACT OF THE DISCLOSURE

A two column molecular sieve chromatography process for separating at least two "pure" components from a xylene or other stream at high feed rates is described. In this process a mixture of three components, for example, A, B and C where A is a meta-xylene (m-xylene)/ortho-xylene (o-xylene) mixture, B is ethylbenzene and C is para-xylene (p-xylene), is fed to a first chromatographic reactor containing a sieve having critical separation coefficients for the three components; said feed is fed at critical feed rates greater than about 2, preferably greater than about 4 times that at which three components can be separated as "pure" components, i.e., free of contamination from each other. It is noted that the meta-xylene (m-xylene)/ortho-xylene (o-xylene) mixture is treated as a "pure" component in this invention since the alphas or separation coefficients between these materia's are usually nearly one. When the above-described feed, A, B and C comprising xylenes is contacted with the sieve in the above manner, a "pure" B+C stream and a stream or streams containing a mixture of A, B and C (and if desired a pure A stream) is recovered from the reactor. The B+C stream is passed to a second separation zone, preferably a second molecular sieve chromatographic reactor where B is separated from C and thus completing the process for obtaining B and C. The process is particularly suitable for separating streams by elution chromatography.

FIELD OF THE INVENTION

Figure 1:
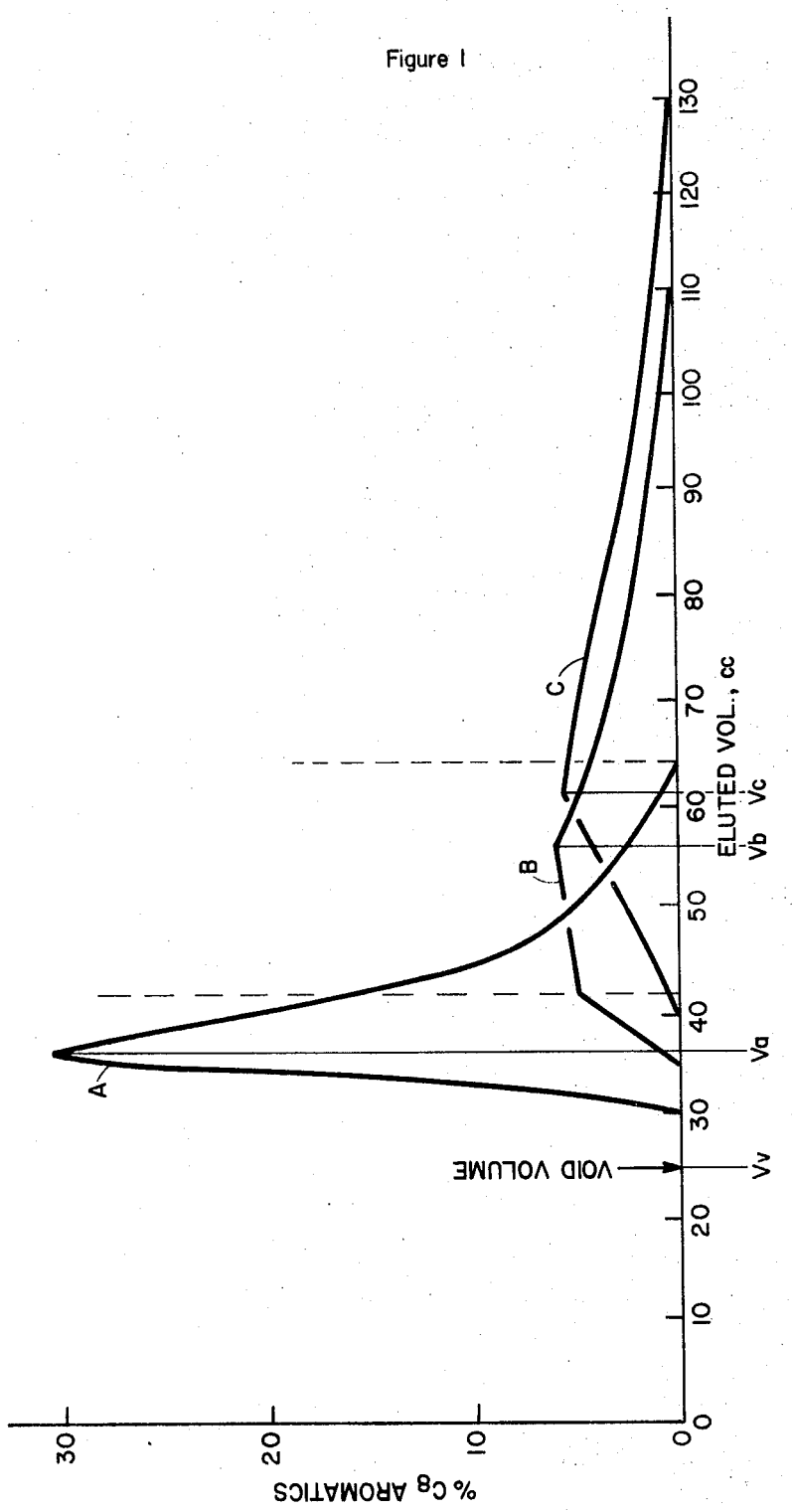

This invention relates to a two column chromatographic process for separating at least two "pure" components at critical feed rates higher than that at which three pure components can be separated in a single column. More particularly, the invention relates to such a process carried out in two columns, employing in the first column sieves having critical separation coefficients (α's) (as hereinafter defined) for the three components, separating a pure B+C stream, and a stream or streams containing a mixture of A, B and C (and if desired a pure A stream), passing the B+C stream to a second reactor containing molecular sieves and separating B from C in such reactor. The method is particularly applicable to a $C_8$ aromatic xylene isomer mixture where A represents meta/ortho xylene, B represents ethylbenzene and C represents para-xylene (p-xylene).

BACKGROUND OF THE INVENTION

Chromatography is a process whereby components contained in a fluid mixture may be separated from the mixture. This is accomplished by the selective retardation of one or more of the components of the fluid mixture as the fluid uniformly moves through a column containing a stationary substrate; the retarding results from the distribution of the components of the mixture between the substrate and the bulk fluid, as this fluid moves past the stationary phase. One of the particular chromatographic methods employed is called elution chromatography. This technique is one in which a sample is introduced at the upstream end of a chromatographic column and pure carrier fluid or eluent is passed simultaneously and continuously (or substantially continuously viz. except during the period in which the feed slug is introduced) through the column. This simultaneous passage of carrier and feed leads to a differential migration of the feed's components according to their distribution between two phases, viz. the moving phase and the stationary phase. If the components of the sample have different distribution coefficients, i.e., selectivities, a separation of the components is achieved as the components will elute in sequence from the end of the stationary phase.

In production elution chromatography utilizing a single chromatographic column, a carrier fluid flows continuously through the system. Periodically, a controlled volume of feed material to be separated (feed slug) is injected for a controlled period of time into the separating column, and is swept by the carrier flow through the column. Actual separation occurs within the column which contains a stationary substrate such as a molecular sieve that acts as the separating agent. The stronger the interaction between the substrate and the feed components, the more slowly a given component is swept through the column by the carrier. As the feed components pass through the column, they separate into discrete bands, provided the column is sufficiently long. Emerging from the column each component is detected and sent to individual units that isolate the purified component from the carrier. The cycle of feed injection is adjusted to introduce each new injection as close as possible to the previous one, but in a way that avoids any overlap between the faster moving components of the new injection with the slower moving components of the previous injection. In carrying out elution chromatography in the above described manner, it is possible to effect the separation of two or more pure components depending upon the particular substrate employed and the differences in the selectivities of the various components on the particular substrate employed.

It is known in the art that substrates such as certain crystalline aluminosilicates, i.e., molecular sieves, can be used to selectively separate one type or class of hydrocarbons from another. Specifically, the separation of $C_8$ aromatic isomers can be effected employing various types of crystalline aluminosilicates to selectively adsorb a given $C_8$ aromatic isomer, thereby allowing recovery of a desired $C_8$ aromatic isomer.

Prior to the present invention it was known to carry out commercial frontal analysis chromatographic processes (as distinguished from the elution chromatography process described above) where the feed stream to be separated comprises $C_8$ aromatic isomer such as m-xylene, o-xylene, p-xylene and ethylbenzene. Such a process would be operated for example in the following way. The feed is passed over a sieve that preferentially adsorbs p-xylene at a rate slow enough for essentially all the p-xylene to be adsorbed rather than breaking through into the raffinate stream. Next the sieve bed is back washed with p-xylene to desorb non-para materials. Finally pure para is desorbed from the sieve bed with a liquid material which can thereafter be easily separated from the para by distillation.

Similarly, in elution chromatography processes, it would be considered to be most advantageous to keep the size of the feed slugs through the column small enough to obtain the removal of the maximum amount of pure p-xylene. In either frontal analysis or elution chromatography, if higher feed rates are used, p-xylene will be lost viz in the frontal analysis process, in the raffinate stream leaving the bed and in the elution chromatography case in the fraction which is removed to prevent impurities being present in the p-xylene "cut."

In a two-stage process in which it is desired to obtain in the first stage a pure p-xylene, ethylbenzene stream (which is then separated in the second column) and a raffinate m-xylene/o-xylene stream to permit isomerization of such latter stream to additional amounts of p-xylene, it would have been thought desirable to pass the feed over the sieve in the first zone at the same feed rate but to continue the feed just long enough for essentially all the p-xylene and ethylbenzene to be adsorbed. At higher rates p-xylene and ethylbenzene would be lost in the raffinate stream leaving the column. Similarly, for an elution chromatography process it would have been thought desirable to use rates (feed slug sizes low enough to prevent loss of appreciable p-xylene and ethylbenzene in the impure fraction which must be removed to prevent m-xylene and o-xylene impurities being present in the p-xylene/ethylbenzene "cut."

It has not been recognized in the art that a much more economic process can be obtained by using much higher than usual feed rates (the amount of feed per hour put through a given size unit). This is normally achieved in the elution chromatography embodiment of the present invention by increasing the feed slug size (which can best be expressed from a process standpoint of lowering the ratio of eluent to feed) in the first column of a two-column separation with the critical sieves taught by the present invention, while maintaining the volume per hour of eluent relatively constant. By this process, although considerable p-xylene and ethylbenzene are "lost" in an impure stream recovered from the column; this stream can be recycled and the cost of this recycle is much more than made up for by the reduction in the size of the column made possible by the higher feed rates, plus the reduction in distillation equipment and process costs made possible by the reduced eluent to feed ratio. Similar savings are obtained in frontal analysis chromatography processes where the higher feed rates cause p-xylene and ethylbenzene to be "lost" as an impure stream in the raffinate which stream is recovered and recycled. Thus, with either process it has now been discovered that a major improvement in chromatographic processes can be obtained by passing the feed over a specific sieve having critical alphas, as hereinafter defined, at much higher rates than was previously thought desirable, separating thereby a pure p-xylene/ethylbenzene fraction and recycling at least a part of the remaining mixture.

SUMMARY OF THE INVENTION

In accordance with the present invention, a two column elution chromatography process for separating at least two "pure" components from xylene or other streams (other streams may include $C_5$ dehydro streams and the like) at high feed rates is described. In this process a mixture of three components, for example, A, B and C where A is a m-xylene/o-xylene mixture, B is ethylbenzene and C is p-xylene, is fed to a first chromatographic column containing a sieve or other partitioning agent having critical separation coefficients for the three components, said feed is fed at critical feed rates greater than about 2, preferably greater than about 4 times and up to 12 times, that at which three components can be separated as "pure" components, i.e., free of contamination from each other. It is noted that the m-xylene/o-xylene mixture is treated as a "pure" component in this invention since the alphas or separation coefficients between these materials are usually nearly one. When the above-described feed, A, B and C comprising xylenes is contacted with the sieve in the above manner, a "pure" B+C stream and a stream or streams containing a mixture of A, B and C (and if desired a "pure" A stream) are recovered from the column. The B+C stream is passed to a second separation zone, preferably a second molecular sieve chromatographic column where B is separated from C thus completing the process for obtaining pure B and C.

The invention will be more readily understood by considering the first stage of the elution chromatography process of this invention for separation of a mixture of $C_8$ aromatics. In the specification, it is noted that the elution chromatography dynamic alphas referred to are defined by the following ratios: the alpha ($\alpha$) between A and C ($\alpha$C/A) is defined as the ratios of the volume of eluent between the void volume (Vv) (see FIG. 1) and the peak of C (Vc) (for purposes of discussion volumes referred to are normal chromatographic retention volumes) to that volume of eluent between Vv and the peak of A (Va), said volumes being determined by utilizing very small feed slug sizes (e.g., 0.1 cc.) below which no further change in the $\alpha$'s occur. The alpha between B and C ($\alpha$C/B) and between A and B ($\alpha$B/A) are defined similarly.

Figure 2:
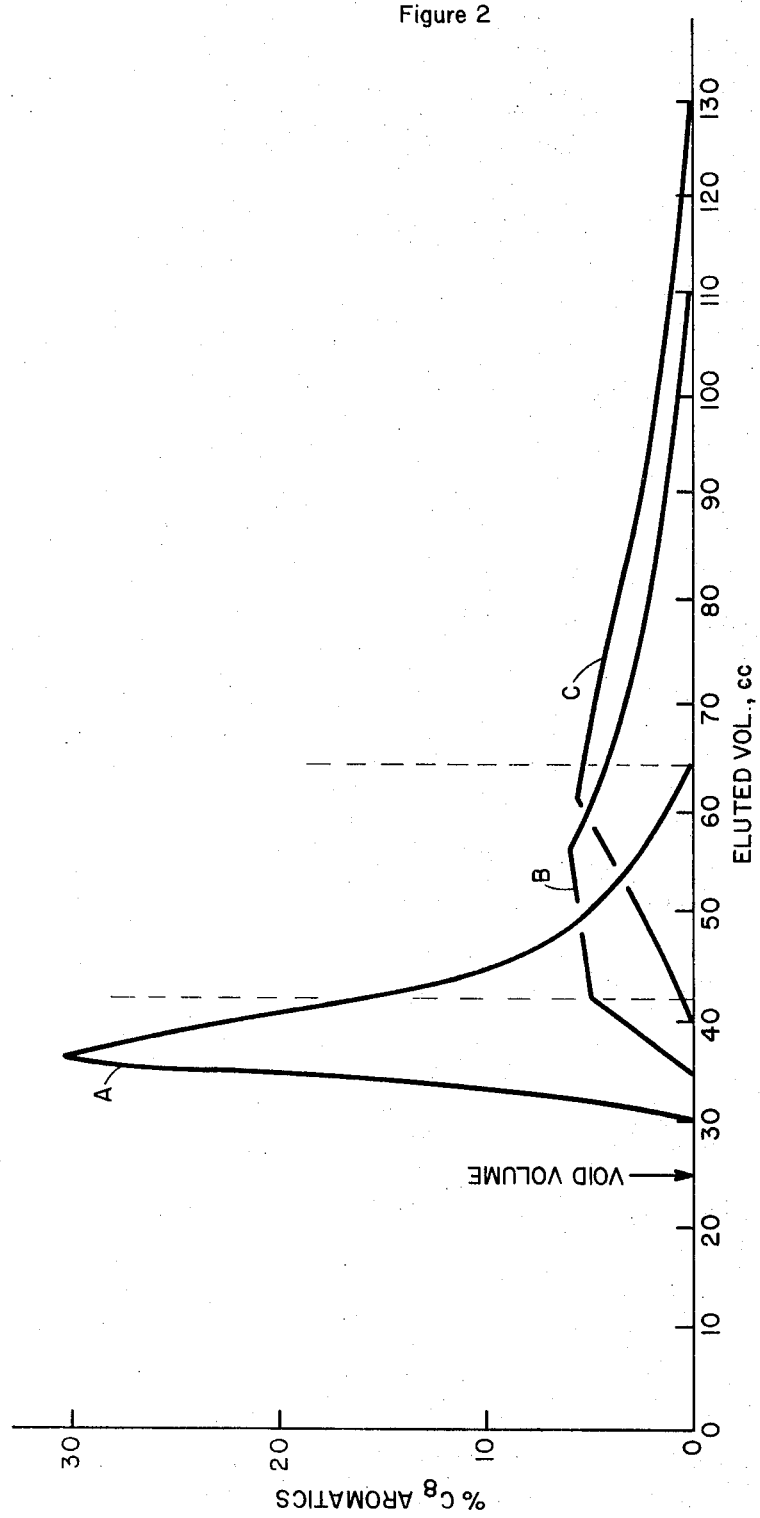

Referring now to FIG. 2 an actual chromatogram is illustrated in which peak A represents m-xylene plus o-xylene, peak B represents ethylbenzene and peak C is p-xylene. Because the m-xylene and o-xylene with the particular sieve employed emerge as one peak, i.e., peak A, the four component mixture can be treated for discussion purposes as a three component mixture. The feed slug employed was approximately 8 cc. of a mixture of 40% m-xylene, 20% o-xylene, 20% ethylbenzene and 20% p-xylene; as will be discussed this is four times the typical feed slug size for conventional separations. The eluent was a 25% o-dichlorobenzene-75% n-decane mixture and the temperature was 100° C.

The above referred to chromatogram utilized a nine foot long column (0.18 inch I.D. although this does not have an important effect upon the chromatogram) containing an adsorbent, i.e., sieve chosen to be used in this invention having the following dynamic selectivity coefficients (alphas): $\alpha$C/A of 3.4 and $\alpha$C/B of 1.6. As a first approximation, the sieves may be screened by utilizing the static condition alphas various reported in published patents, e.g., U.S. 3,126,425; U.S. 3,626,020. However, dynamic alphas include the effect of temperature and eluting agents. The eluted volume, E is the total volume between the beginning of A, i.e., 30 cc. and the end of C, i.e., 130 cc.; for FIG. 2, E has a value of about 100 c.c.

It is seen from FIG. 2, that for recovery of pure B and C (uncontaminated by A) only the portion of product eluent between 65 cc. and 130 cc. can be recovered and the portion of eluent between 35 cc. and 65 cc. must be recycled. This amount of recycle represents about 75% of the total area under the curves of product in the eluent (300% of fresh feed or 75% of total feed to column) and further approximates an upper limit for the amount of recycle that may be carried out from an economic standpoint.

Alternatively, by the present invention the amount of recycle can be reduced from the 75% level experienced above down to about 63%. This is accomplished by recycling only that portion of product eluent between 40 cc. and 65 cc. with the remainder of the eluent, i.e., between 30 cc. and 40 cc., which contains only A and B being recovered and used as motor gasoline or sent to isomerization to produce additional C.

The advantages of the two column scheme are immediately apparent from the above discussion. First of all the size of the first column is only one-fourth that of the prior art one column process and the second column might be, for example, about 50% of the size of said prior art column. Hence, the overall reduction in column size might be about 25%. Secondly, the overall distillation costs for separating product from eluent are greatly reduced due to the four fold increase in concentration of xylene present in the eluent from the first column.

Figure 3:
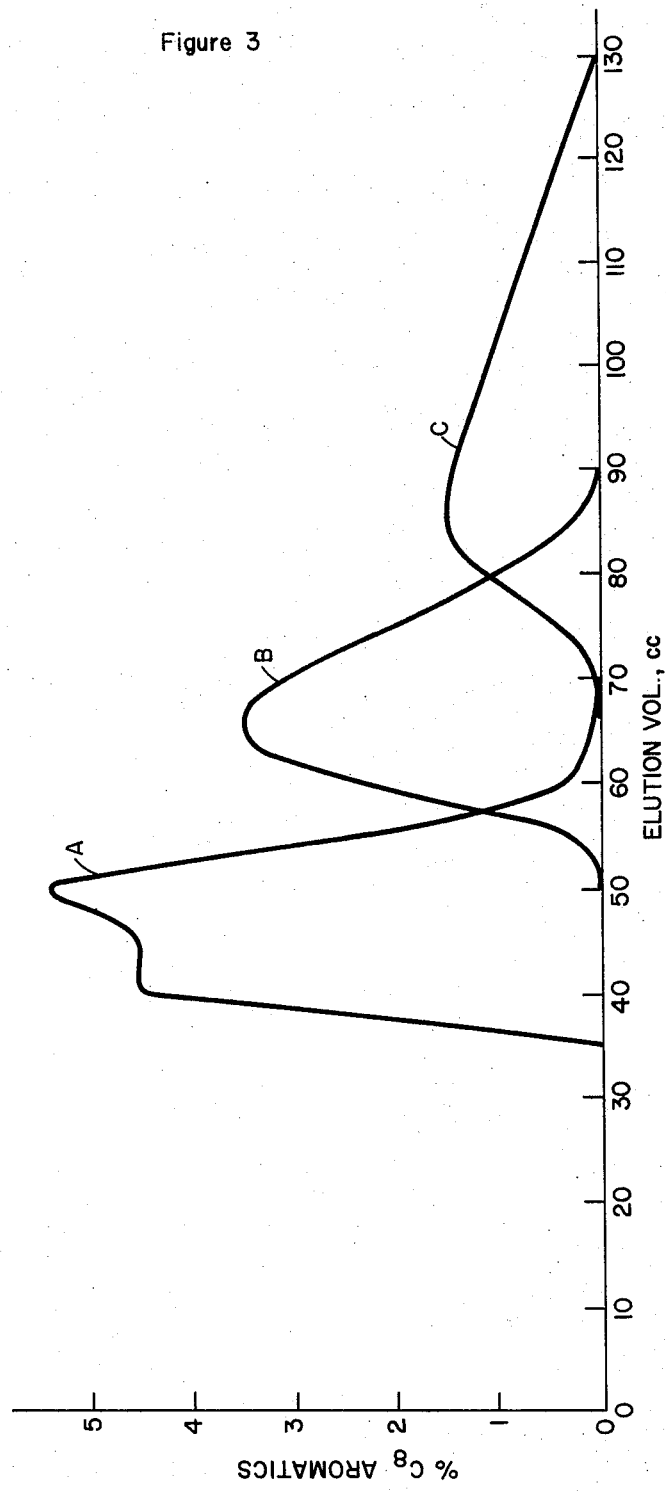

This improvement over the prior art can best be seen by referring to FIG. 3, which is a chromatogram of a column operated with a conventional 2 cc. feed slug of the above mixture rather than 8 cc. feed slug discussed above. Less overlap between peak A (m-xylene and o-xylene) and peak B (ethylbenzene) occurs, viz. compare 65 cc. to 35 cc. of FIG. 1 with 65 cc. to 50 cc. of FIG. 2.

The total elution volume for FIG. 3 is about the same as for FIG. 1. The recycle ratio required to obtain pure ethylbenzene and p-xylene components utilizing a 2 cc. feed is 75%. The advantage of the 2 column system is that the feed slug size is increased by 300%.

It is noted that FIG. 3 represents the maximum feed slug size that can be used to separate three pure components, i.e., the portion of product between 50 cc. and 65 cc. and the portion between 70 cc. and 90 cc. can be recycled. The 2 cc. feed slug size represents approximately the maximum slug size for the prior art one column scheme, i.e., pure B+C obtained in the portion of product between 65 cc. and 90 cc. and pure C between 90 cc. and 130 cc. However, the critical feed rates for the processes of the present invention are feed rates greater than about 2, preferably greater than about four times the maximum feed rate that can be employed in a single column scheme whereby three pure components are separated.

In comparing FIGS. 2 and 3, it is seen that the feed slug employed in FIG. 2 of 8 cc. provides an eluent to feed ratio E/F of about 100/8 or 12.5; the feed slug utilized in FIG. 3 was 2 cc. thereby yielding an eluent to feed ratio of 100/2 or 50. Hence it is eminently clear that by utilizing an 8 cc. feed slug in the two column scheme of the present invention an improvement over the prior art one column scheme is obtained.

Figure 4:
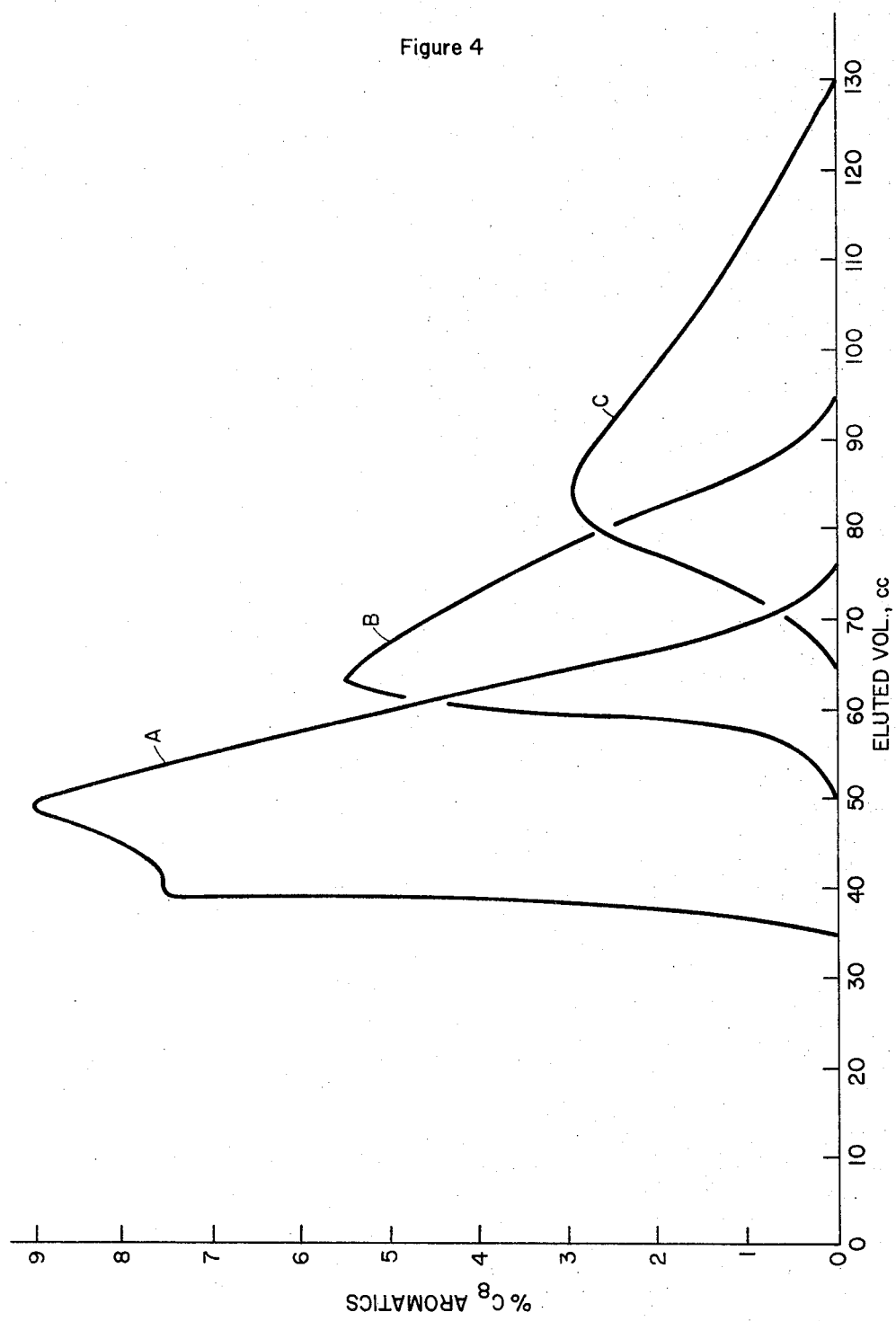

FIG. 4, wherein a 4 cc. feed slug size is utilized again, demonstrates that in two column system of the present invention, although recycle ratio has been decreased from FIG. 2, but more importantly the eluent to fed ratio has been reduced from the conventional or 2 cc. feed slug size in a single column scheme. The total eluent is again about 100 cc., the eluent to feed ratio is 100/4 or 25. At the same time instead of recycling that portion between 50 cc. and 65 cc. and from 70 cc. to 90 cc. as described in FIG. 2 to obtain pure B and pure C, the portion between 50 cc. and 75 cc. for FIG. 3 is recycled. Hence, again by utilizing the two column chromatographic scheme of the present invention and two times the feed rate of the conventional one column scheme, it is possible to obtain a more economic process.

Applying the present invention teaching to commercial elution chromatography equipment, the optimum feed slug size varies with the particular eluent, length of column, temperature, sieve, etc. However, according to this invention, in all cases the critical feed slug size will be at least twice, preferably at least four times the maximum to obtain three pure components in a single column scheme. As discussed above, the optimum feed slug size is dependent upon parameters such as column operating temperatures. In general for $C_8$ aromatic separations these tempeartures will be in the range of from 25 to 200° C., more preferably from 75 to 160° C., and most preferably from 90 to 145° C. Additionally the optimum feed slug size is dependent upon the particular eluting agent employed. For the practice of the present invention, eluting agents which are useful may be generally described as materials having adsorptivities similar to the xylenes. Preferred eluting agents are aromatics and substituted aromatics used pure or in admixture with weakly adsorbed materials such as paraffins; 15-100% by wt. of eluting agents is employed in combination with the paraffins for weakly adsorbed eluting agents and; 10-60% by wt. of eluting agent in paraffin for more strongly adsorbed eluting agents. Pressures are not critical and the present process may be operated at pressures in the range of from 0.1 to 50 atm.; preferably from 0.1 to 10 atm.; most preferably from 1 to 5 atm. Nonlimiting representative examples of eluting agents include orthodichlorobenzene, paradichlorobenzene, mesitylene, indane, toluene, cyclohexylbenzene and the like.

In carrying out the process to obtain pure B and C (ethylbenzene and p-xylene) other means of separating B from C in the second separation zone include crystallization as well as fractionation methods. Preferably the means for separating B from C is through the use of a second chromatographic column containing a molecular sieve having $\alpha$'s defined as $\alpha C/B$ of greater than 1.4 and is operated at temperatures in the range of from ambient to 200° C., and eluting agents as described above are employed. Preferably, however, the sieves are K-Y sieves and the eluting agent is o-dichlorobenzene.

It is believed that the above described advantages of overload (high feed rates) in combination with the two column chromatographic process is made possible because of the utilization of an adsorbent sieve in the first column which has a critical combination of alphas. It is moreover believed that the choice of the correct first column sieve involves selecting a sieve which has an $\alpha C/A$ approaching infinity as a maximum while at the same time exhibiting an $\alpha C/B$ approaching unity as a minimum. For separation of xylene mixtures the alphas preferably will be $\alpha C/A$ of 2 to $\infty$, more preferably 2.5 to $\infty$ and $\alpha C/B$ of 1.0 to $\alpha C/A$, more preferably of 1.0 to 0.5 $\alpha C/A$.

Referring now to preferred processes for carrying out the present invention, the preferred elution chromatograph process has already been described. Other preferred processes include "simulated moving bed" techniques. It is noted that in all the following descriptions as was stated above with respect to the preferred elution chromatograph process, the second column can be replaced by any other means of separation (e.g., crystallization, distillation, extraction, etc.).

Figure 5:
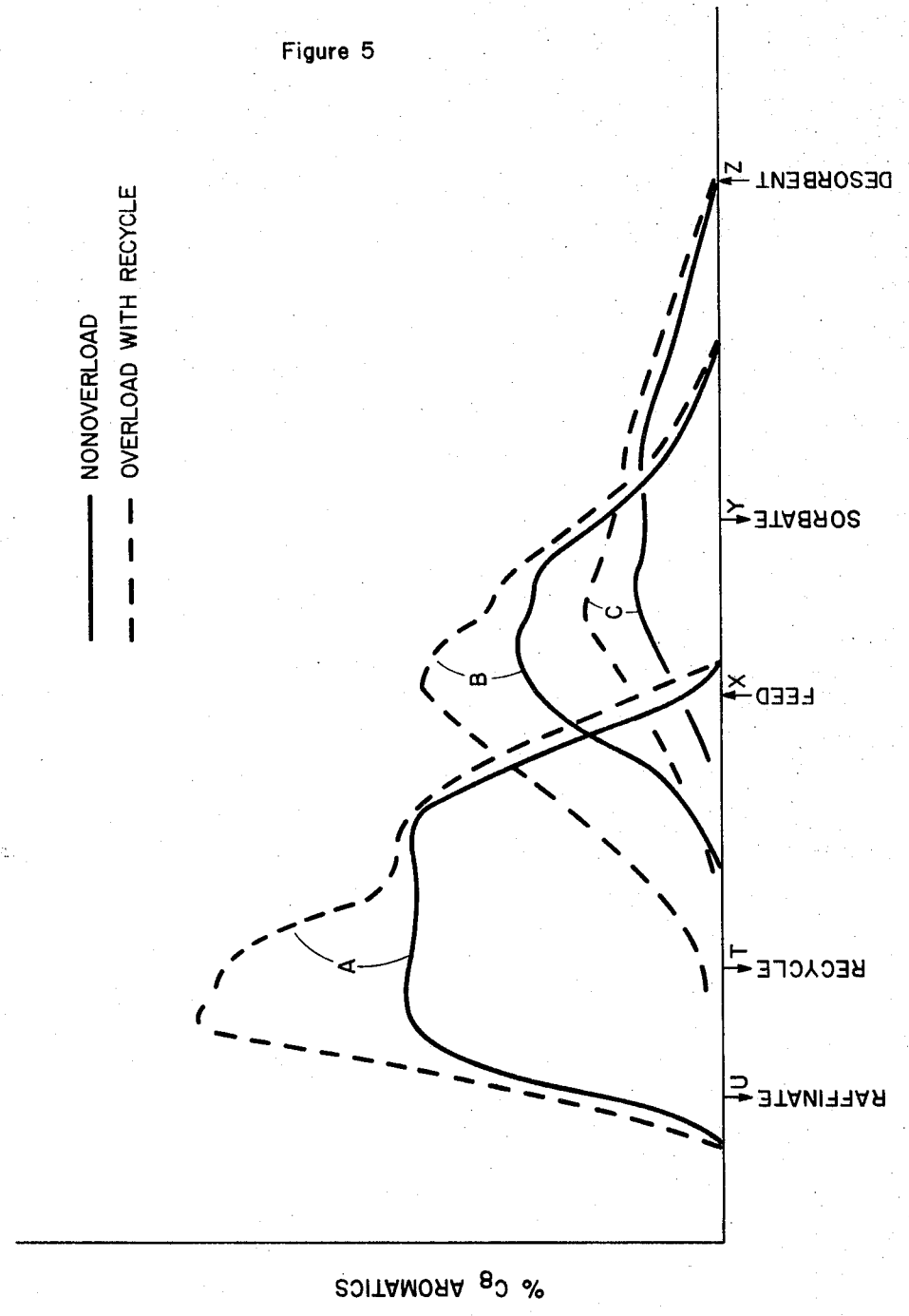

An example of "simulated moving bed process" is adequately described in U.S. 2,985,589. In such process instead of increasing feed slug size, the rate of operation can be speeded up by increasing the feed and product take-off rates while at the same time decreasing or maintaining constant the desorbent rates. Alternatively the process can be improved by decreasing the desorbent input rate; additionally improvements can be obtained by shortening column length. The effect of this is shown schematically in FIG. 5. The solid lines represent operation of the simulated moving bed without recycle. The operation is carried out at maximum rates to maintain maximum product recovery with specified purity. By using critical feed rates as hereinafter defined by the present invention and by taking off and recycling a stream as indicated in FIG. 5, much higher throughputs can be obtained as indicated by the dotted lines of FIG. 5. The economics of the operation are thus much improved.

More specifically, the present invention process may easily be adopted to a "simulated moving bed" process by selecting an adsorption agent sieve such as a potassium-Y sieve having dynamic alphas as defined above and according to the above-described criteria and using critically higher feed rates as hereinafter defined. FIG. 5 can also be used to illustrate how such a process could be operated. Feed (A, B and C) would be introduced at e.g. feed point X in the bed in accordance with usual practice. Flow of feed and eluent is from right to left in the figure which exemplifies the steady state concentration profile of the xylene mixture at a given time. Simultaneous with feed injection at X, a desorbent or eluent is also introduced at e.g., point Z in the bed. In prior art practice a "simulated moving bed" process is carried out by utilizing a valving system by which feed and eluent are fed into separate portions of the bed for a certain period of time, e.g., 10 minutes; at another point Y in this bed, product p-xylene and ethylbenzene is withdrawn in combination as the case may be; at a latter point, e.g. U, raffinate is drawn off and the cycle is repeated again at new portions of the bed with fresh feed and eluent again being fed for another 10 minute period et cet. However, in practicing the present invention, a larger "overload" quantity of feed would be introduced by e.g., increasing feed and product take-off rates, so that it becomes impossible to withdraw all of component A free of p-xylene and ethylbenzene.

Instead, two raffinate streams would be taken off at strategic points such as U and T; a first stream at U containing pure A, free of p-xylene and ethylbenzene losses, and a second stream at T (recycle) containing A, B and C. The second raffinate stream is then recycled to minimize B and C losses. Preferably instead of two streams at two points T and U, a single stream is withdrawn at a single point for two given time periods. Additionally, a product extract stream is withdrawn upstream from the feed point at point Y and would contain B and C. The quantity of adsorption agent (bed size) and desorption agent would be unchanged from usual practice, but a much larger quantity of feed could be processed, thereby decreasing the overall eluent to feed ratio with aforesaid advantages of reducing distillation costs etc. The product stream, B and C, could then be sent to a second adsorption column or other separation device where the two products could be separated in desired purity. Overload in context of the invention operated with the above-described "simulated moving bed" means increasing the feed rate to two times, preferably four times, the maximum feed rate employed in said "simulated moving bed" process wherein there is obtained a single raffinate stream containing all of component A and substantially free of paraxylene. By "substantially free" is meant less than 10% of the feed paraxylene.

The invention has been described herein with reference to certain preferred embodiments. However, it is not to be considered as limited thereto as obvious variations thereon will become apparent to those skilled in the art.

What is claimed is:

1. An elution chromatography process for separating a pure p-xylene/ethylbenzene fraction from a C$_8$ aromatic mixture containing p-xylene and ethylbenzene which comprises:
    (a) contacting said C$_8$ aromatic isomer mixture *in the liquid phase* in a first chromatographic column with a molecular sieve; said sieve having an

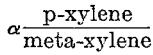

of greater than about 2 and an

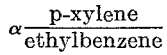

in the range of from about 1 to

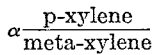

said contacting being conducted at temperatures in the range of 25 to 200° C. and carried out at a feed rate greater than about 2 times the maximum feed rate at which three components can be separated pure in a single column chromatographic column;
    (b) passing through said chromatographic column an eluent selected from the group consisting of aromatics and substituted aromatics;
    (c) recovering from said first chromatographic column a stream containing ethylbenzene and paraxylene and a stream or streams containing a mixture of m-xylene, o-xylene, ethylbenzene and p-xylene; and
    (d) recycling at least a portion of said stream containing m-xylene, o-xylene, ethylbenzene and p-xylene to said first chromatographic column;
    (e) passing a portion of said stream containing ethylbenzene and p-xylene recovered in said (c) above to a second chromatographic column containing a second molecular sieve; contacting said stream with a second molecular sieve under adsorption conditions to effect the selective adsorption of one of the components of said stream and thereby recovering from said second chromatographic column enriched p-xylene and ethylbenzene streams.

2. The process of claim 1 wherein the feed rate employed in (a) is greater than four times the maximum feed rate at which three components can be separated pure in a single column chromatographic column.

3. The process of claim 1 wherein the recycling of (c) does not exceed 300% of the total volume based on fresh feed.

4. The process of claim 1 wherein said second molecular sieve employed is an ammonium modified potassium Y faujasite.

5. The process of claim 1 wherein said contacting in the first chromatographic column is carried out at temperatures in the range of from about 75° C. to about 160° C.

6. The process of claim 1 wherein said eluent is orthodichlorobenzene.

7. The process of claim 1 wherein said contacting in the first chromatographic column is carried out at temperatures in the range of from 90 to 145° C.

8. The process of claim 1 wherein the molecular sieve used in said first chromatographic column is K–Y sieve.

9. In a simulated moving bed, liquid chromatography process separating a pure p-xylene/ethylbenzene fraction with a C$_8$ aromatic mixture containing pure p-xylene and ethylbenzene, which comprises:
    (a) introducing the feed containing said C$_8$ aromatic mixture into one zone of a fixed bed containing a molecular sieve, said sieve having an

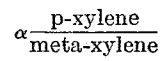

of greater than about 2 and a

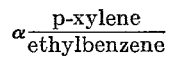

in the range of from about 1 to

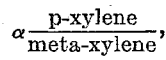

said bed containing at least four serially interconnected zones having fluid flow connecting means between adjacent zones and between the outlet of the last zone and the inlet of the first zone; to thereby provide cyclic, fluid flow in said process;
    (b) introducing a desorbent into another zone of the fixed bed which is downstream relative to the zone into which said feed is charged;
    (c) simultaneously withdrawing at least a portion of a stream containing ethylbenzene and paraxylene from an intermediate zone of said fixed bed, between the zone into which feed is charged and the zone into which desorbent is charged;
    (d) simultaneously withdrawing at least a portion of a raffinate stream containing meta-xylene, orthoxylene, ethylbenzene and paraxylene from a zone which is downstream with respect to the zone into which said desorbent is charged;
    (e) maintaining a circulating stream of fluid through said series of interconnecting and periodically advancing zones downstream the point of charging said feedstock while simultaneously and equally advancing the points of charging desorbent and withdrawing said streams wherein the improvement comprises: increasing the rate of feed introduction to the bed to about two times and up to four times the maximum feed rate employed wherein there is obtained a single raffinate stream containing all of metaxylene-orthoxylene substantially free of paraxylene, said increased feed rates being capable of decreasing overall desorbent to feed ratios and thereby resulting in an improved process for the separation of a pure p-xylene/ethylbenzene fraction from said C$_8$ aromatic isomer mixture.

10. The process of claim 9 wherein at least a portion of said stream containing ethylbenzene and paraxylene is passed into a second chromatographic column containing a second molecular sieve; contacting said stream with said second molecular sieve under adsorption conditions to effect the selective adsorption of one of the components of said stream; recovering from said second chromatographic column enriched paraxylene and ethylbenzene streams.

11. The process of claim 9 wherein said sieve is a potassium-Y faujasite.

References Cited

UNITED STATES PATENTS

| | | | |
|---|---|---|---|
| 3,126,425 | 3/1964 | Eberly, Jr. et al. | 260—674 |
| 3,626,020 | 12/1971 | Neuzil | 260—674 SA |
| 3,724,170 | 4/1973 | Allen et al. | 55—75 X |
| 3,136,616 | 6/1964 | Thompson | 55—67 |
| 3,654,145 | 4/1972 | Brunnock | 55—67 |
| 3,656,278 | 4/1972 | Drinkard | 55—67 |

JOHN ADEE, Primary Examiner

U.S. Cl. X.R.

55—67